US011426874B2

United States Patent
Chung et al.

(10) Patent No.: US 11,426,874 B2
(45) Date of Patent: Aug. 30, 2022

(54) ROBOT-BASED INSERTION MOUNTING OF WORKPIECES

(71) Applicant: FLEXIV LTD., Santa Clara, CA (US)

(72) Inventors: Shuyun Chung, San Jose, CA (US); Shiquan Wang, Foster City, CA (US)

(73) Assignee: FLEXIV LTD., Grand Cayman (KY)

( * ) Notice: Subject to any disclaimer, the term of this patent is extended or adjusted under 35 U.S.C. 154(b) by 247 days.

(21) Appl. No.: 16/399,409

(22) Filed: Apr. 30, 2019

(65) Prior Publication Data

US 2020/0346349 A1 Nov. 5, 2020

(51) Int. Cl.
 *B25J 9/16* (2006.01)

(52) U.S. Cl.
 CPC .............. *B25J 9/1687* (2013.01); *B25J 9/161* (2013.01); *B25J 9/163* (2013.01); *B25J 9/1664* (2013.01)

(58) Field of Classification Search
 CPC ............................. B25J 9/1697; B25J 9/1633
 See application file for complete search history.

(56) References Cited

U.S. PATENT DOCUMENTS

| 2008/0312769 | A1* | 12/2008 | Sato ........................ B25J 9/1687 700/249 |
| 2017/0205797 | A1* | 7/2017 | Bohner ................. G05B 19/182 |
| 2018/0029234 | A1* | 2/2018 | Ueda ..................... B25J 15/0019 |
| 2019/0184564 | A1* | 6/2019 | Muraoka ................ B25J 9/1633 |
| 2019/0270207 | A1* | 9/2019 | Motowaki ............. B25J 17/0208 |
| 2019/0332097 | A1* | 10/2019 | Canberi ................. B25J 9/0093 |
| 2019/0381669 | A1* | 12/2019 | Ogawara ................ B25J 13/085 |
| 2020/0023521 | A1* | 1/2020 | Dan ........................ B25J 9/1697 |
| 2020/0180157 | A1* | 6/2020 | Ueda ...................... B25J 9/1687 |
| 2020/0368861 | A1* | 11/2020 | Artigas .................. B25J 9/1687 |

* cited by examiner

*Primary Examiner* — Jaime Figueroa
*Assistant Examiner* — Jerrod Irvin Davis
(74) *Attorney, Agent, or Firm* — K&L Gates LLP (57) ABSTRACT

Methods and systems for insertion mounting workpieces are provided. In one embodiment, a method is provided that includes acquiring a position of the second fitting part of the receiving component, moving the first fitting part of the workpiece towards the second fitting part of the receiving component until the workpiece is in contact with the receiving component, and rotating the workpiece while pressing the workpiece towards the receiving component. The implementation of the present disclosure may be applied for various types of workpieces and receiving components and may overcome minor deviations of positions between the workpiece and the receiving component during the insertion operation, thereby improving the efficiency of the insertion operation.

18 Claims, 8 Drawing Sheets

ROBOT-BASED INSERTION MOUNTING OF WORKPIECES

BACKGROUND

Industrial robots may be utilized to perform many jobs. When a robot performs an insertion operation, it receives a workpiece to be inserted and moves it towards a receiving part. The robot then inserts the insertion part of the workpiece into an opening of the receiving part. The insertion part and the receiving part may be successfully mounted once the insertion part is completely or sufficiently inserted into the receiving part.

However, in some situations, the workpiece may be blocked during insertion and prevented from successful insertion into the receiving part due to the existence of a positioning error of the receiving part, a motion control error of the workpiece, or due to structural complexity of the two components.

SUMMARY

Accordingly, the present disclosure aims to provide a controlling method to successfully account for such situations when insertion mounting workpieces, as well as a robot and a non-transitory readable medium implementing the same.

To solve the above-mentioned problem, a method for controlling a robot may be provided for mounting a workpiece and a receiving component by insertion. The workpiece may have a first fitting part and the receiving component may have a second fitting part. The method may include acquiring a position of the second fitting part of the receiving component, moving the first fitting part of the workpiece towards the second fitting part of the receiving component until the workpiece is in contact with the receiving component, and rotating the workpiece while pressing the workpiece towards the receiving component.

In another embodiment, a robot may be provided that includes a robotic arm, a processor, and a memory. The memory may store program instructions which, when executed by the processor, cause the processor to acquire positions of a first fitting part of a workpiece and a second fitting part of a receiving component, control the robotic arm to move the first fitting part toward the second fitting part, detect that the workpiece is in contact with the receiving component, and control the robotic arm to rotate the workpiece while pressing the workpiece against the receiving component.

In a further embodiment, a non-transitory, computer-readable medium may be provided. The non-transitory, computer-readable medium may store instructions which, when executed by a processor, cause the processor to acquire positions of a first fitting part of a workpiece and a second fitting part of a receiving component, control a robotic arm to move the first fitting part towards the second fitting part, detect that the workpiece is in contact with the receiving component, and control the robotic arm to rotate the workpiece while pressing the workpiece against the receiving component.

BRIEF DESCRIPTION OF THE DRAWINGS

In order to clearly explain the technical solutions in the embodiments of the present disclosure, the drawings used in the description of the embodiments will be briefly described below. The drawings in the following description are merely exemplary embodiments of the present disclosure. For those of ordinary skill in the art, other embodiments may also be derived based on these drawings without any creative work.

DETAILED DESCRIPTION

The disclosure will now be described in detail with reference to the accompanying drawings and examples. The described embodiments are merely exemplary and represent a subset of the embodiments of the present disclosure. One skilled in the art may recognize additional embodiments based on the embodiments of the present invention without creative efforts and all such embodiments fall within the scope of the present invention.

Figure 1:
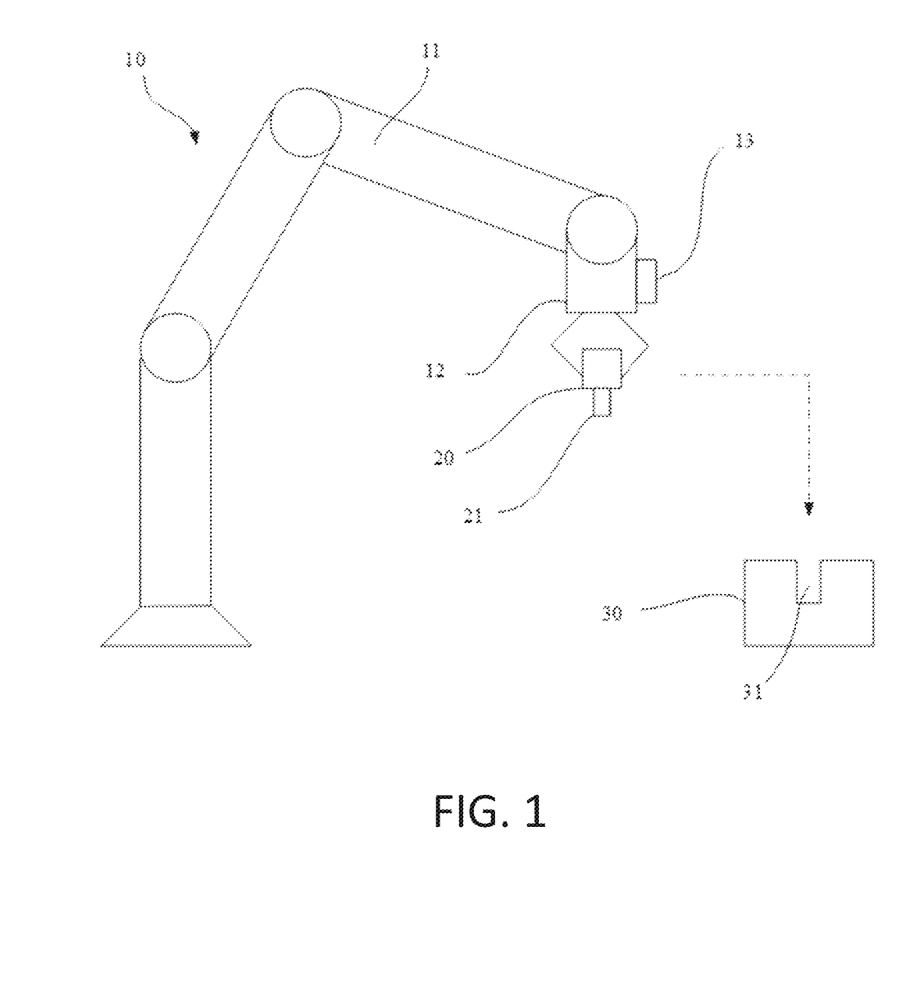
FIG. 1 illustrates a robot according to an exemplary embodiment of the present disclosure.

FIG. 1 illustrates a robot 10 according to an exemplary embodiment of the present disclosure. The robot 10 may be assigned to insertion mount a workpiece 20 and a receiving component 30. In an exemplary embodiment, the robot 10 may include a robotic arm with several links 11 and an end effector 12 (e.g., a tool). For example, the end effector 12 may include a gripper and a camera module 13, as depicted. The workpiece 20 and the receiving component 30 may each have a fitting part 21, 31. In this embodiment, the fitting part 21 of the workpiece 20 may be a protrusion (e.g., a plug) and the fitting part 31 of the receiving component 30 may be an opening defined in the receiving component 30. In other embodiments, the fitting part 21 of the workpiece 20 may be an opening defined in the workpiece 20 while the fitting part 31 of the receiving component 30 may be a protrusion. In some embodiments, the workpiece 20 may be mounted onto and moved using the gripper of the end effector 12 of the robot 10 to mount the workpiece 20 onto the end effector 12. In other embodiments, the gripper may be replaced by another installation mechanism, so long as the end effector 12 can still manipulate the workpiece 20. Those of ordinary skill in the art should understand that the robot 10 may further include other components such as sensors and actuators, which may be mounted along one or more of the links 11 and/or the end effector 12. The motion of the links 11 and the end effector 12 may be controlled such that the robot 10 grabs or otherwise manipulates the workpiece 20 to perform the operations described below to insert the workpiece 20 into the receiving component 30, and/or to mount the workpiece 20 and the receiving component 30.

Figure 2:
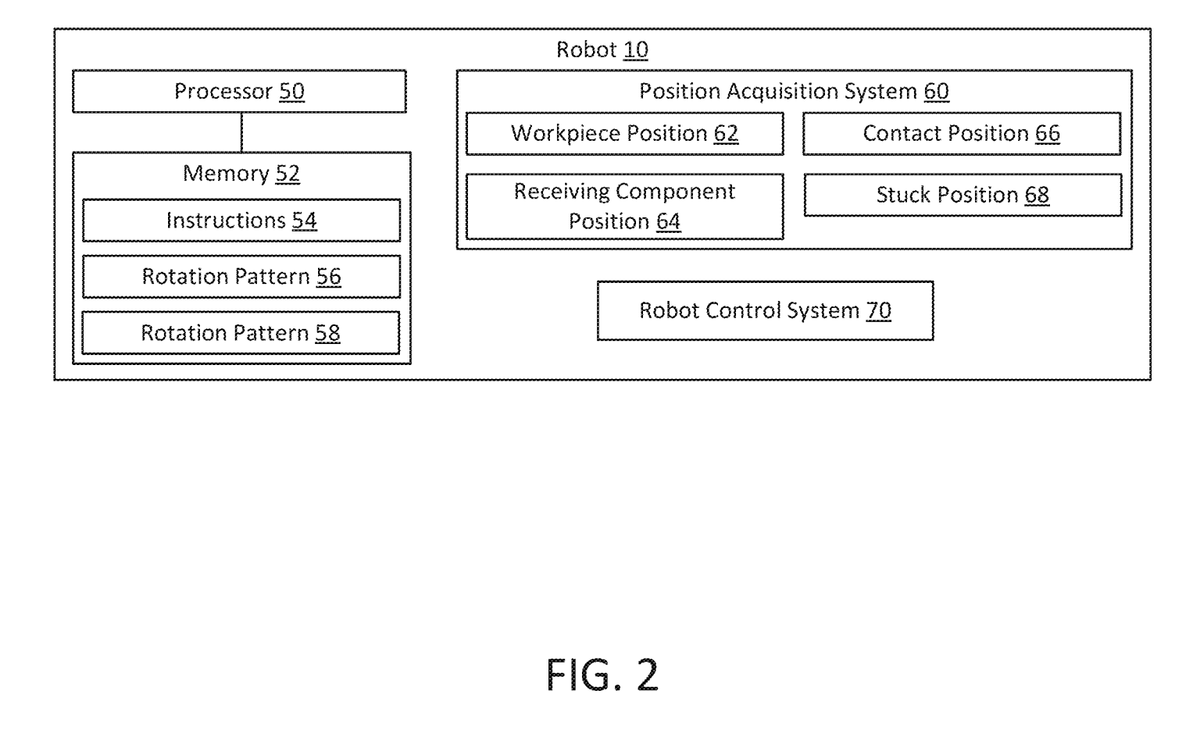
FIG. 2 illustrates a block diagram of a robot according to an exemplary embodiment of the present disclosure.

FIG. 2 illustrates a block diagram of the robot 10 according to an exemplary embodiment of the present disclosure. The block diagram may illustrate a control system of the robot 10 configured to control the movements of the robot 10 so as to insertion mount the workpiece 20 into the receiving component 30.

The robot 10 includes a memory 52, a processor 50, a position acquisition system 60, and a robot control system 70. The position acquisition system 60 may be configured to acquire one or more positions useful to controlling the operation of the robot 10. For example, the position acquisition system 60 may determine these positions based on sensor data from one or more sensors, such as a camera module 13, ultrasonic sensor, laser sensor, or other location sensor. In particular, the position acquisition system 60 may be configured to determine a workpiece position 62 representing the position of all or part of the workpiece 20 at a given point in time. For example, the workpiece position 62 may reflect a central position and/or orientation of the workpiece 20 overall, or may represent the location of a specific portion of the workpiece 20, such as a tip of the end effector 21. The position acquisition system 60 may similarly determine a receiving component position 64, such as a position of the receiving component 30 overall, or a portion of the receiving component (e.g., the end of the fitting part 31). In situations where the workpiece 20 and the receiving component 30 are in contact, the position acquisition system 60 may determine a contact position 66 of the workpiece 20. Similarly, in situations where the workpiece 20 is stuck during an attempted mounting operation with the receiving component, the position acquisition system 60 may determine a stuck position 68 of the workpiece 20 indicating the position at which the workpiece 20 is stuck.

The robot control system 70 may be configured to cause the robot 10 (e.g., the robotic arm) to move and manipulate the workpiece 20 such that the workpiece 20 is insertion mounted in the receiving component 30. For example, the robot 10 may move the workpiece 20 according to one or more rotation patterns 56, 58 stored in the memory 52.

The memory 52 may also store instructions 54 for execution by the processor 50. For example, the instructions 54, when executed by the processor 50, may cause the processor 50 to implement one or more functions of the position acquisition system 60 and/or the robot control system 70, as well as additional functions discussed herein.

The processor 50 may be implemented as one or more of, e.g., a central processing unit (CPU), other general-purpose processor, digital signal processor (DSP), application specific integrated circuit (ASIC), field-programmable gate array (FPGA), other programmable logic device, discrete gates or transistor logic devices, and/or discrete hardware components. The general-purpose processor may be a microprocessor or any other conventional processor.

The memory 52 may be an internal storage unit of the robot 10 such as a hard disk or memory of the robot 10. Alternatively, the memory 52 may be one or more of, e.g., an external storage device of the robot 10, such as plug-in hard disk, smart media card (SMC), secure digital (SD) card, flash card. In some embodiments, the memory 52 may include both the internal and external storage units of the robot 10. The memory 52 may be utilized to store program instructions and other programs and data necessary for operations of the robot 52. The memory 52 may also be utilized to temporarily store data which has been sent or will soon be sent.

Figure 3:
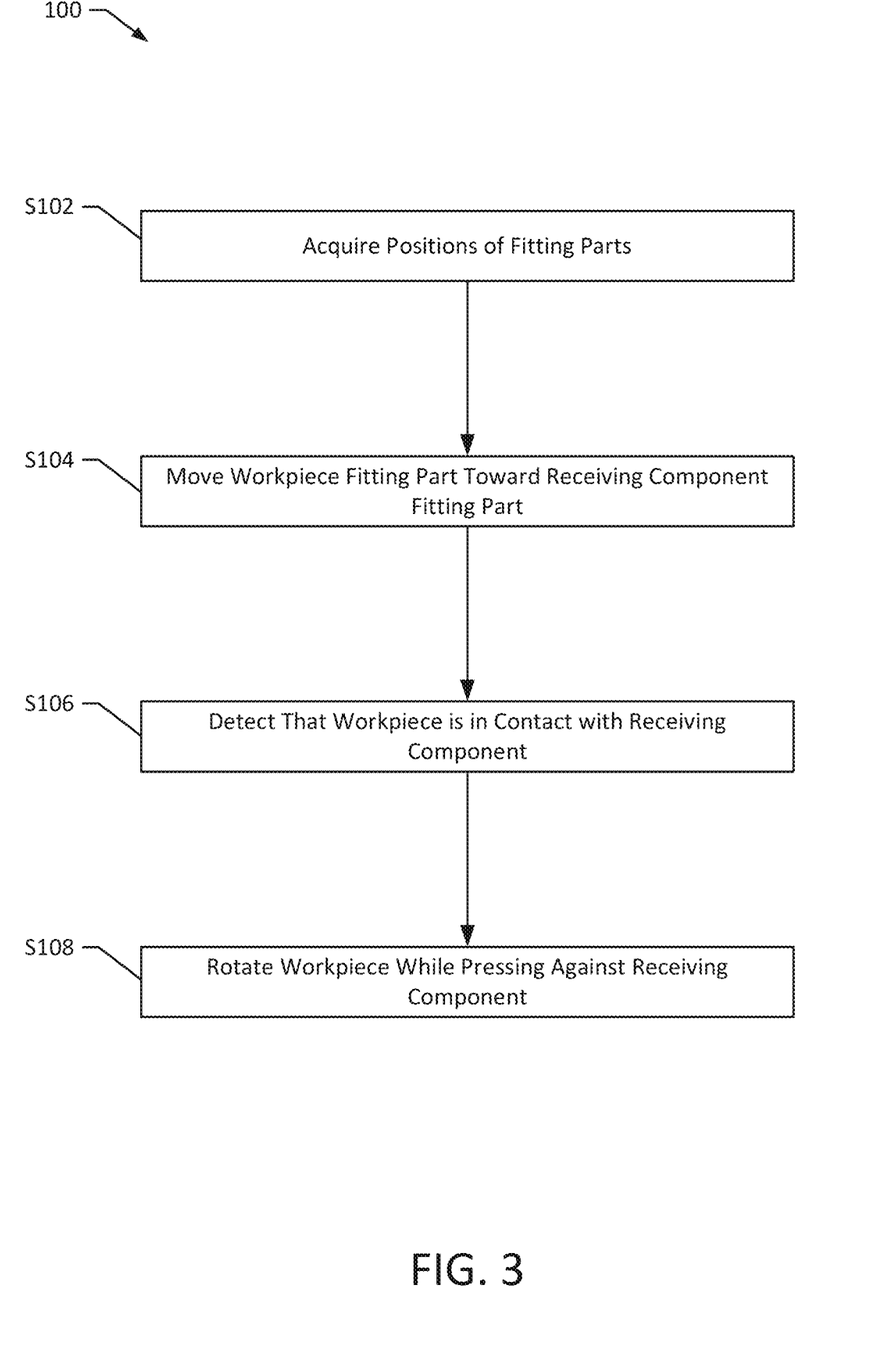
FIG. 3 illustrates a flow chart of a method according to an exemplary embodiment of the present disclosure.

FIG. 3 illustrates a method 100 according to an exemplary embodiment of the present disclosure. The method 100 may be performed by a robot 10 to insertion mount a workpiece 20 and a receiving component 30. The method 100 may be implemented at least in part on a computer system. For example, method 100 may be implemented, at least in part, by the position acquisition system 60 and the robot control system 70. The method 100 may also be implemented by a set of instructions stored on a computer readable medium that, when executed by a processor, cause the computer system to perform the method. For example, all or part of the method 100 may be implemented by the processor 50, the memory 52, and the instructions 54. Although the examples below are described with reference to the flowchart illustrated in FIG. 3, many other methods of performing the acts associated with FIG. 3 may be used. For example, the order of some of the blocks may be changed, certain blocks may be combined with other blocks, one or more of the blocks may be repeated, and some of the blocks described may be optional.

The method 100 may begin with the robot 10 acquiring positions of the fitting parts 21, 31 of the workpiece 20 and the receiving component 30 (block S102). These positions 62, 64 may be determined at least in part on data from the camera module 13 and may indicate the locations of the fitting parts 21, 31 in a three-dimensional operational space of the robot 10. For example, the position acquisition system 60 may acquire the workpiece position 62 indicating the position of the fitting part 21 and the receiving component position 64 indicating the position of the fitting part 31. In particular, the camera module 13 of the robot 10 may record images of the receiving component 30 during motion of the robot. As a result, the shape of the receiving component 30 and its relative position (or absolute position) with respect to the end effector 12 or the workpiece 20 may be recognized. It should be understood that the position of the fitting part 31 of the receiving component 30 may alternatively be acquired in other ways. For example, if the position of the receiving component 30 is fixed and known, the operator of the robot 10 may simply enter its position into the control system of the robot 10.

The robot 10 may then move the fitting part 21 of the workpiece 20 towards the fitting part 31 of the receiving component 30 (block S104). The robot 10 may move the fitting part 21 of the workpiece 20 toward the fitting part 31 of the receiving component 30 until the workpiece 20 is in contact with the receiving component 30. The robot 10 may also be configured to automatically move the workpiece 20 towards the receiving component 30 and to align the fitting part 21 of the workpiece with the fitting part 31 of the receiving component 30. In certain implementations, the robot 10 may try to insert the fitting part 21 of the workpiece 20 into the fitting part 31 of the receiving component 30. The trajectory along which the workpiece 20 is moved may be predefined. One exemplary trajectory is shown in the form of a dotted line in FIG. 1.

The robot 10 may then detect that the workpiece 20 is in contact with the receiving component 30 (block S106). For example, the robot 10 may include one or more force or torque sensors. When the workpiece 20 touches the receiving component 30, the force and/or torque sensor readings may increase. Based on this increase, the robot 10 may determine that the workpiece 20 is in contact with the receiving component 30.

The robot 10 may then rotate the workpiece 20 while pressing the workpiece 20 towards the receiving component 30 (block S108). In this operation, the robot 10 may be operated in a torque-controlled mode which is able to adjust the compliance of end-effector motion of the end effector 12 to maintain a desired level of torque while rotating the workpiece 20. By rotating the workpiece 20, the robot 10 may find a proper posture between the fitting parts 21, 31 to allow insertion of the fitting part 21 of the workpiece 20 into the fitting part 31 of the receiving component 30. Once the workpiece 20 rotates to an angle where there is little resistance against pressing the workpiece 20 towards the receiving component 30, the end effector 12 may press the workpiece 20 and insert its fitting part 21 into the fitting part 31 of the receiving component 30. Controlling the workpiece 20 in this manner may help prevent the workpiece 20 from getting stuck even if there exists a slight error in the workpiece position 62 and/or the receiving component position 64, or if there exists a small obstacle (e.g., metal burr or deformation on the workpiece 20 and/or receiving component 30) in the insertion path.

Figure 5:
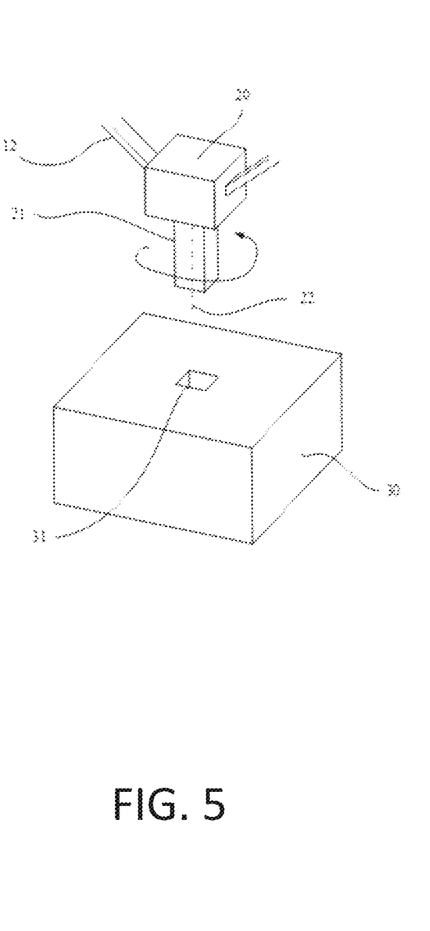
FIGS. 5-7 illustrate rotation patterns for rotating a workpiece according to exemplary embodiments of the present disclosure.
Figure 6:
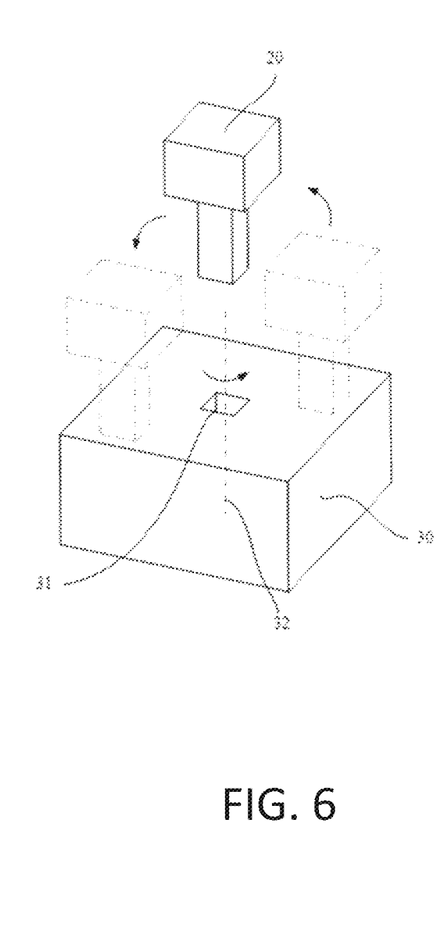
Figure 7:
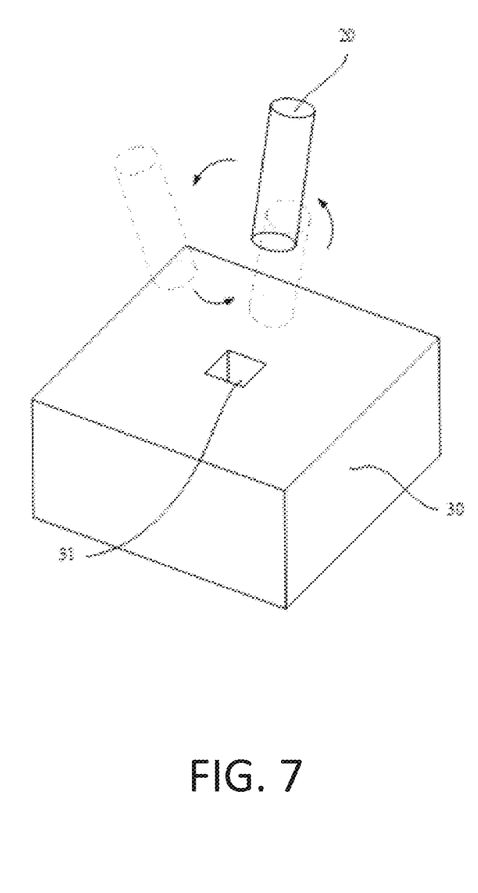

In some embodiments, the robot 10 may rotate the workpiece 20 according to the rotation pattern about an insertion axis 22 of the fitting part 21 of the workpiece 20 itself, as illustrated in FIG. 5. In other embodiments, the robot 10 may move the workpiece 20 about an insertion axis 32 of the fitting part 31 of the receiving component 30, as illustrated in FIG. 6. It should be understood that the insertion axes 22, 32 may represent a central line or a symmetry axis of their respective components. In certain instances, one component (e.g., the workpiece 20 or the receiving component 30) may be moved along its insertion axis 22, 32 to be inserted into the other component. In some embodiments, multiple types of rotation can be combined. That is, the robot 10 may rotate the workpiece 20 about the insertion axis 22 of the fitting part 21 of the workpiece 20 itself and the insertion axis 32 of the fitting part 31 of the receiving component 30 at the same time. In still further embodiments, the robot 10 may rotate the workpiece 20 to perform a cone-shaped motion about the insertion axis of the receiving component 30, as shown in FIG. 7. This method may facilitate the insertion operation for certain types of workpieces and receiving components. In certain instances, the above-discussed types of rotations depicted in FIGS. 5-7 may be stored as rotation patterns 56, 58 of the memory 52.

Figure 4A:
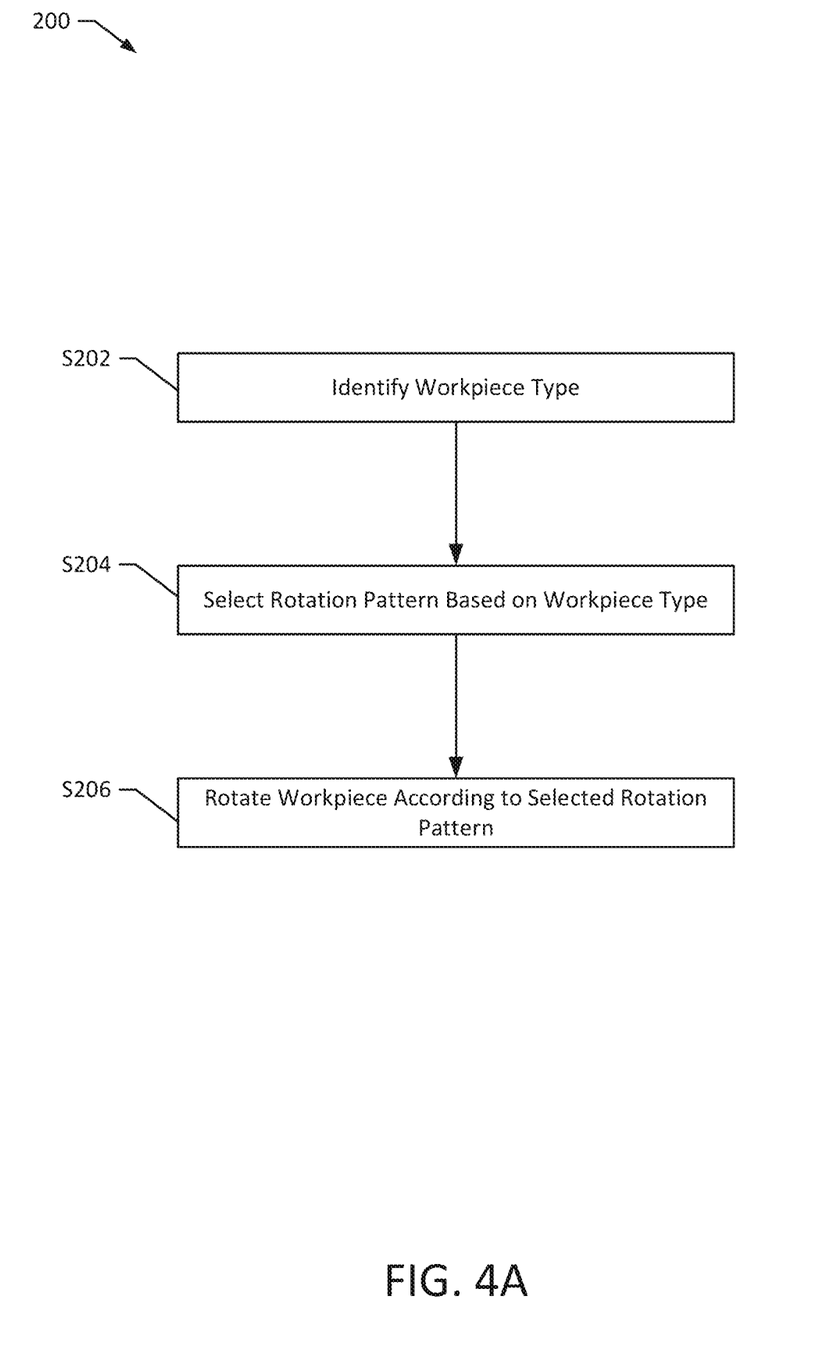
FIGS. 4A-4C illustrate flowcharts of methods according to exemplary embodiments of the present disclosure.

For example, FIG. 4A depicts a method 200 according to an exemplary embodiment of the present disclosure. The method 200 may be performed to select and perform a rotation pattern 56, 58 appropriate for a certain workpiece 20 and/or receiving component 30. The method 200 may be implemented at least in part on a computer system. For example, method 200 may be implemented, at least in part, by the position acquisition system 60 and the robot control system 70. The method 200 may also be implemented by a set of instructions stored on a computer readable medium that, when executed by a processor, cause the computer system to perform the method. For example, all or part of the method 200 may be implemented by the processor 50, the memory 52, and the instructions 54. Although the examples below are described with reference to the flowchart illustrated in FIG. 4A, many other methods of performing the acts associated with FIG. 4A may be used. For example, the order of some of the blocks may be changed, certain blocks may be combined with other blocks, one or more of the blocks may be repeated, and some of the blocks described may be optional.

The method 200 may begin with the robot 10 identifying a workpiece type for the workpiece 20 (block S202). In certain implementations, the workpiece type may be predetermined and a user may enter the workpiece type or may have previously entered a workpiece type. In other implementations, the camera array 13 or another sensor of the robot 10 may determine the workpiece type. For example, the workpiece 20 may include an identifier (e.g., a bar code, QR code, RFID tag, or NFC chip) that identifies the workpiece type. In another example, the robot 10 may analyze the workpiece 20 to determine the workpiece type (e.g., using the camera array 13).

The robot 10 may then select a rotation pattern 56, 58 based on the determined workpiece type (block S204). For example, the robot control system 70 may select the rotation pattern 56, 58. In certain implementations, the memory may store one or more associations between rotation patterns 56, 58 and workpiece types and the robot 10 may select the rotation pattern 56, 58 associated with the identified workpiece type. In still further implementations, these associations may be determined by a machine learning model.

For example, the robot 10 (e.g., the machine learning model) may collect data on a plurality of insertion mounting operations, including insertion mounting operations with different types of workpieces 20. The machine learning model may then analyze the data to detect correlations between certain types of workpieces 20 and certain types of rotation patterns 56, 58. Based on these correlations, the machine learning model may then generate the associations between different workpiece types and the rotation patterns 56, 58.

The robot 10 may then rotate the workpiece 20 according to the selected rotation pattern 56, 58 (block S206). For example, the robot control system 70 may cause the robot 10 to rotate the workpiece 20 according to the selected rotation pattern 56, 58.

Figure 4B:
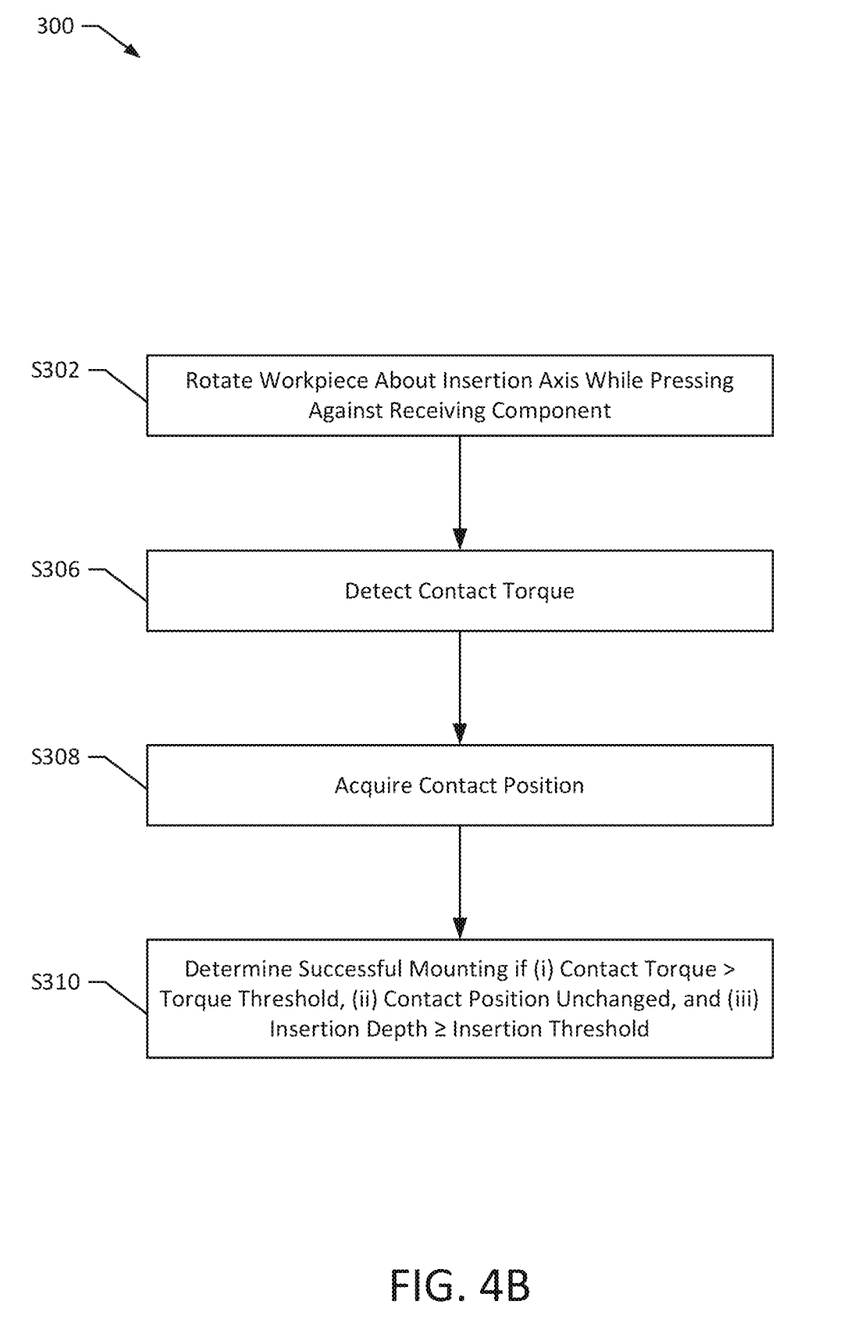

FIG. 4B depicts a method 300 according to an exemplary embodiment of the present disclosure. The method 300 may be performed to determine whether the workpiece 20 and the receiving component 30 have been successfully mounted. For example, the robot 10 may perform the method 300 after completing the method 100 to confirm successful insertion mounting of the workpiece 20, or may be performed prior to rotating the workpiece at block S108. The method 300 may be implemented at least in part on a computer system. For example, method 300 may be implemented, at least in part, by the position acquisition system 60 and the robot control system 70. The method 300 may also be implemented by a set of instructions stored on a computer readable medium that, when executed by a processor, cause the computer system to perform the method. For example, all or part of the method 300 may be implemented by the processor 50, the memory 52, and the instructions 54. Although the examples below are described with reference to the flowchart illustrated in FIG. 4B, many other methods of performing the acts associated with FIG. 4B may be used. For example, the order of some of the blocks may be changed, certain blocks may be combined with other blocks, one or more of the blocks may be repeated, and some of the blocks described may be optional.

The method 300 may begin with the robot 10 rotating the workpiece 20 about an insertion axis while pressing the workpiece 20 against the receiving component 30 (block S302). For example, the robot 10 may rotate the workpiece 20 about the insertion axis 22 of the fitting part 21. The workpiece 20 may be rotated clockwise, counter-clockwise, or both.

During the rotation, the robot 10 may continuously detect a contact torque (block S306) acting on the workpiece 20 and a contact position 66 of the workpiece 20 (block S308). Based on the contact position 66, the robot 10 may calculate an insertion depth between the workpiece 20 and the receiving component 30. For example, the insertion depth may be acquired by comparing an initial contact position between the workpiece 20 and the receiving component 30 and an updated (e.g., real-time) contact position of the workpiece 20.

The robot 10 may then determine successful mounting if (i) the contact torque acting on the workpiece 20 exceeds a predefined torque threshold, (ii) the updated contact position of the workpiece 20 unchanged for at least a predetermined period of time, and (iii) the insertion depth is greater than a predefined insertion threshold (block S310). Each of these conditions may be required to determine successful mounting. For example, based on conditions (i) and (ii), the robot 10 may determine that the movement of the workpiece 20 is blocked by the receiving component 30. Such situations may be acceptable if the workpiece 20 is successfully mounted. Therefore, condition (iii) may further be required to ensure that successful mounting has occurred. In this situation, if the insertion depth between the workpiece 20 and the receiving component 30 reaches a predefined value, the robot 10 may determine that the workpiece 20 and the receiving component 30 have been successfully mounted. The predefined torque threshold and/or the predefined insertion threshold may be based on the shape and size of the fitting parts 21, 31 of the workpiece 20 and the receiving component 30. For example, the thresholds may be predetermined for different types of workpieces 20, receiving components 30, and fitting parts 21, 31 by a user and/or a machine learning model.

If the robot determines at block S310 that the workpiece 20 has been successfully mounted, then the insertion mounting operation may be complete. If, however, the workpiece 20 is not successfully mounted, processing may continue (e.g., to block S108 and/or to the method 400 discussed below).

Figure 4C:
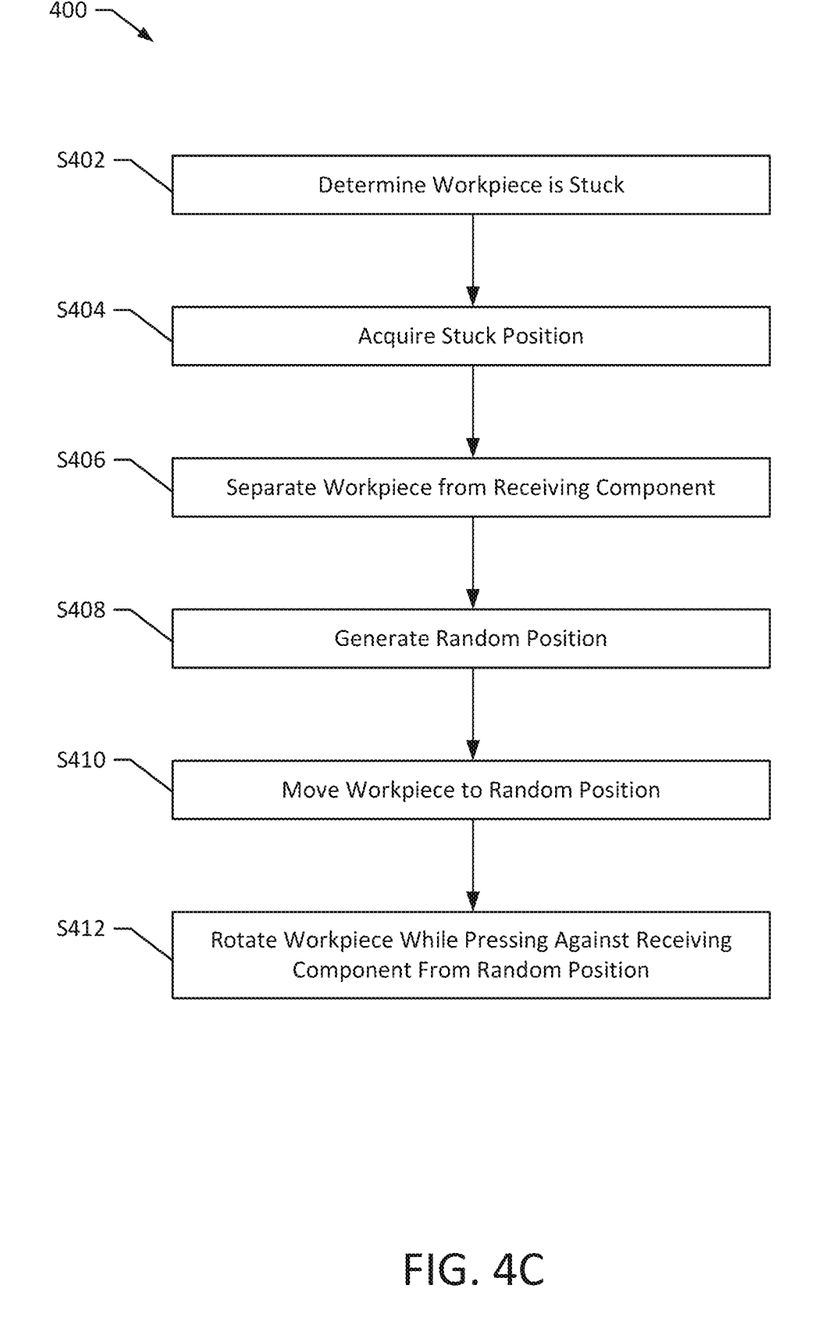

FIG. 4C depicts a method 400 according to an exemplary embodiment of the present disclosure. The method 400 may be performed to identify and handle situations where a workpiece 20 is stuck during an insertion mounting operation (e.g., while performing the methods 100, 200, 300). In particular, during an insertion mounting operation, the workpiece 20 may get stuck during rotation by the robot 10, without being successfully mounted. Thus, it may be necessary for the robot 10 to detect and handle situations where the workpiece 20 is stuck during operation. The method 400 may be implemented at least in part on a computer system. For example, method 400 may be implemented, at least in part, by the position acquisition system 60 and the robot control system 70. The method 400 may also be implemented by a set of instructions stored on a computer readable medium that, when executed by a processor, cause the computer system to perform the method. For example, all or part of the method 400 may be implemented by the processor 50, the memory 52, and the instructions 54. Although the examples below are described with reference to the flowchart illustrated in FIG. 4C, many other methods of performing the acts associated with FIG. 4C may be used. For example, the order of some of the blocks may be changed, certain blocks may be combined with other blocks, one or more of the blocks may be repeated, and some of the blocks described may be optional.

The method 400 may begin with the robot 10 determining that the workpiece 20 is stuck (block S402). For example, the robot 10 may determine that the workpiece 20 is stuck if an insertion depth (e.g., an insertion depth calculated as explained above) does not change for a predetermined period of time while the workpiece 20 is rotated. In another example, the robot 10 may detect a contact force and a contact torque acting on the workpiece 20 and a contact position 66 of the workpiece 20. If either or both of the contact force and the contact torque do not exceed predefined thresholds, the movement of the workpiece 20 may be blocked by the receiving component 30. In such situations, if the insertion depth between the workpiece 20 and the receiving component 30 is smaller than the predefined insertion threshold, the robot may determine that the workpiece 20 has not been completely inserted and is stuck.

The robot 10 may then determine a stuck position 68 of the workpiece 20 (block S404). For example, the robot 10 may determine the stuck position 68 as the workpiece position 62 at the time that the workpiece 20 is determined to be stuck.

The robot 10 may then separate the workpiece 20 from the receiving component 30 (block S406). In certain situations, the robot 10 may be able to separate the workpiece 20 and receiving component 30 by pulling the two apart. In other situations, it may be necessary to rotate one or both of the workpiece 20 and the receiving component 30 during separation. For example, in certain instances, the robot 10 may at least partially reverse a rotation pattern 56, 58 performed to attempt insertion mounting the workpiece 20.

The robot 10 may also generate a random position by applying a random change to the stuck position (block S408). For example, the robot 10 may generate the random position such that the fitting part 21 of the workpiece 20 is touching or near the surface or fitting part 31 of the receiving component 30. The robot 10 (e.g., the robot control system 70) may then move the workpiece 21 to the random position (block S410).

The robot 10 may then proceed with rotating the workpiece 20 while pressing the workpiece 20 against the receiving component 30 from the random position (block S412). For example, the robot 10 may proceed with rotating the workpiece 20 according to a rotation pattern 56, 58, as discussed above in connection with block 108.

By performing the method 400, the robot 10 may move the workpiece 20 slightly away from the workpiece 20 such that the workpiece 20 is no longer stuck. Then, when the robot 10 proceeds with re-attempting the insertion mounting operation, the motion trajectory of the workpiece 20 may change because the operation is restarted from a new position, which may avoid repeating similar issues that caused the workpiece 20 to get stuck. In this way, the success rate of the insertion mounting operation may improve.

Those of ordinary skill in the art understand that each of the disclosed methods and procedures described in this disclosure can be implemented using one or more computer programs or components. These components may be provided as a series of computer instructions on any conventional computer readable medium or machine readable medium, including volatile and non-volatile memory, such as RAM, ROM, flash memory, magnetic or optical disks, optical memory, or other storage media. The instructions may be provided as software or firmware, and may be implemented in whole or in part in hardware components such as ASICs, FPGAs, DSPs, or any other similar devices. The instructions may be configured to be executed by one or more processors, which when executing the series of computer instructions, performs or facilitates the performance of all or part of the disclosed methods and procedures.

It should be understood that various changes and modifications to the examples described here will be apparent to those skilled in the art. Such changes and modifications can be made without departing from the spirit and scope of the present subject matter and without diminishing its intended advantages. It is therefore intended that such changes and modifications be covered by the appended claims. In other respects, the discussed or depicted coupling (e.g., direct coupling or communicative coupling) between components may be via one or more wired or wireless interfaces (e.g., electrical and/or mechanical interfaces).

If a software function unit is realized and used as a product, it can be stored in a readable storage medium in a computer. Based on this understanding, the technical plan proposed by the present disclosure may be essentially or partially realized as a software product. In other cases, one or more parts of the above-described systems and methods that are beneficial to the conventional technology may be realized as the form of a software product. The software product may be stored in a storage medium, including one or more instructions for a computational device (such as a personal computer, a server, or a network device) to perform all or some of the steps disclosed by the embodiments of the present disclosure. The storage medium may include one or more media capable of storing program codes, such as one or more of a USB disk, a mobile hard disk, a read-only memory (ROM), a random-access memory (RAM), and a floppy disk.

The invention claimed is:

1. A method comprising:
    acquiring positions of a first fitting part of a workpiece and a second fitting part of a receiving component;
    moving the first fitting part toward the second fitting part;
    detecting that the workpiece is in contact with the receiving component by detecting that a torque acting on the workpiece exceeds a first predefined threshold;
    rotating the workpiece while pressing the workpiece against the receiving component;
    determining that the workpiece is stuck;
    acquiring a stuck position of the workpiece;
    separating the workpiece from the receiving component by at least partially reversing the rotation and pulling the workpiece away from the receiving component;
    selecting an updated position by applying a change to the stuck position of the workpiece;
    moving, after selecting the updated position, the workpiece to the selected updated position; and
    rotating the workpiece while pressing the workpiece against the receiving component from the updated position.

2. The method of claim 1, wherein rotating the workpiece comprises:
    rotating the workpiece in place about an insertion axis of the first fitting part.

3. The method of claim 1, wherein rotating the workpiece comprises:
    rotating the workpiece in a circular pattern about an insertion axis of the second fitting part.

4. The method of claim 1, wherein rotating the workpiece comprises:
    rotating the workpiece in a cone-shaped pattern about an insertion axis of the second fitting part.

5. The method of claim 1, wherein rotating the workpiece comprises:
    identifying a workpiece type of the workpiece;
    selecting a rotation pattern from a plurality of rotation patterns based on the workpiece type; and
    rotating the workpiece according to the selected rotation pattern.

6. The method of claim 5, wherein the plurality of rotation patterns are determined by a machine learning algorithm.

7. The method of claim 6, wherein the machine learning algorithm determines the plurality of rotation patterns by:
    collecting data on a plurality of insertion mounting operations;
    analyzing the data to detect correlations between a plurality of workpiece types including the workpiece type of the workpiece; and
    generating a plurality of associations between at least a subset of the plurality of workpiece types and one or more rotation patterns of the plurality of rotation patterns.

8. The method of claim 1, wherein detecting that the workpiece is in contact with the receiving component further comprises:
    detecting that a contact force acting on the workpiece exceeds a second predefined threshold.

9. The method of claim 1, further comprising:
    determining, prior to rotating the workpiece, whether the workpiece and the receiving component have been successfully mounted.

10. The method of claim 9, wherein determining whether the workpiece and the receiving component have been successfully mounted comprises:
    rotating the workpiece about an insertion axis of the first fitting part while pressing the workpiece against the receiving component;
    detecting a contact torque acting on the workpiece;
    acquiring a contact position of the workpiece; and
    determining that the workpiece and the receiving component have been successfully mounted upon detecting that (i) the contact torque acting on the workpiece exceeds a predefined torque threshold, (ii) the contact position of the workpiece is unchanged for a predetermined period of time, and (iii) an insertion depth between the first fitting part and the second fitting part meets or exceeds a predefined insertion threshold.

11. The method of claim 1, wherein determining that the workpiece is stuck comprises:
    detecting one or both of a contact force and a contact torque acting on the workpiece;
    acquiring a contact position of the workpiece; and
    determining that the workpiece is stuck upon detecting that (i) one or both of the contact force exceeds a predefined force threshold and the contact torque exceeds a predefined torque threshold, and (ii) an insertion depth between the first fitting part and the second fitting part is smaller than a predefined insertion threshold.

12. A system comprising:
    a robotic arm;
    a processor; and
    a memory storing instructions which, when executed by the processor, cause the processor to:
        acquire positions of a first fitting part of a workpiece and a second fitting part of a receiving component;
        control the robotic arm to move the first fitting part toward the second fitting part;
        detect that the workpiece is in contact with the receiving component by detecting that a torque acting on the workpiece exceeds a first predefined threshold;
        control the robotic arm to rotate the workpiece while pressing the workpiece against the receiving component;
        determine that the workpiece is stuck;
        acquire a stuck position of the workpiece;
        control the robotic arm to separate the workpiece from the receiving component by at least partially reversing the rotation and pulling the workpiece away from the receiving component;
        select an updated position by applying a change to the stuck position of the workpiece;
        control, after selecting the updated position, the robotic arm to move the workpiece to the selected updated position; and
        control the robotic arm to rotate the workpiece while pressing the workpiece against the receiving component from the updated position.

13. The system of claim 12, wherein the memory contains further instructions which, when executed by the processor when controlling the robotic arm to rotate the workpiece, cause the processor to control the robotic arm to perform at least one of:
- rotate the workpiece in place about an insertion axis of the first fitting part;
- rotate the workpiece in a circular pattern about an insertion axis of the second fitting part; and
- rotate the workpiece in a cone-shaped pattern about an insertion axis of the second fitting part.

14. The system of claim 12, wherein the memory contains further instructions which, when executed by the processor when controlling the robotic arm to rotate the workpiece, cause the processor to:
- identify a workpiece type of the workpiece;
- select a rotation pattern from a plurality of rotation patterns based on the workpiece type; and
- control the robotic arm to rotate the workpiece according to the selected rotation pattern.

15. The system of claim 12, wherein the memory contains further instructions which, when executed by the processor when detecting that the workpiece is in contact with the receiving component, cause the processor to:
- detect a contact force acting on the workpiece exceeds a second predefined threshold.

16. The system of claim 12, wherein the memory contains further instructions which, when executed by the processor, cause the processor to:
- control the robotic arm to rotate the workpiece about an insertion axis of the first fitting part while pressing the workpiece against the receiving component;
- detect a contact torque acting on the workpiece;
- acquire a contact position of the workpiece; and
- determine that the workpiece and the receiving component have been successfully mounted upon detecting that (i) the contact torque acting on the workpiece exceeds a predefined torque threshold, (ii) the contact position of the workpiece is unchanged for a predefined period of time, and (iii) an insertion depth between the first fitting part and the second fitting part meets or exceeds a predefined insertion threshold.

17. The system of claim 12, wherein the memory contains further instructions which, when executed by the processor when determining that the workpiece is stuck, cause the processor to:
- detect one or both of a contact force and a contact torque acting on the workpiece;
- acquire a contact position of the workpiece; and
- determine that the workpiece is stuck upon detecting that (i) one or both of the contact force exceeds a predefined force threshold and the contact torque exceeds a predefined torque threshold, and (ii) an insertion depth between the first fitting part and the second fitting part is smaller than a predefined insertion threshold.

18. A non-transitory, computer-readable medium storing instructions which, when executed by a processor, cause the processor to:
- acquire positions of a first fitting part of a workpiece and a second fitting part of a receiving component;
- control a robotic arm to move the first fitting part towards the second fitting part;
- detect that the workpiece is in contact with the receiving component by detecting that a torque acting on the workpiece exceeds a predefined threshold;
- control the robotic arm to rotate the workpiece while pressing the workpiece against the receiving component;
- determine that the workpiece is stuck;
- acquire a stuck position of the workpiece;
- control the robotic arm to separate the workpiece from the receiving component by at least partially reversing the rotation and pulling the workpiece away from the receiving component;
- select an updated position by applying a change to the stuck position of the workpiece;
- control, after selecting the updated position, the robotic arm to move the workpiece to the selected updated position; and
- control the robotic arm to rotate the workpiece while pressing the workpiece against the receiving component from the updated position.

* * * * *